United States Patent [19]

Loock et al.

[11] Patent Number: 5,729,581
[45] Date of Patent: Mar. 17, 1998

[54] CORE SHROUD, IN PARTICULAR FOR CLADDING A REACTOR CORE IN A BOILING-WATER NUCLEAR REACTOR AND A METHOD FOR REPAIRING A CORE SHROUD

[75] Inventors: Ralf Loock, Baiersdorf; Theo Käufl, Neumarkt; Herbert Schramm, Höchstadt, all of Germany

[73] Assignee: Siemens Aktiengesellschaft, Munich, Germany

[21] Appl. No.: 818,318

[22] Filed: Mar. 14, 1997

Related U.S. Application Data

[63] Continuation of PCT/DE95/01186, Sep. 1, 1995.

[30] Foreign Application Priority Data

Sep. 14, 1994 [DE] Germany ............... 44 32 616.5

[51] Int. Cl.[6] .................................................. G21C 19/00
[52] U.S. Cl. ........................ 376/260; 376/287; 376/302
[58] Field of Search .................................. 376/203, 205, 376/260, 287, 288, 293, 302, 451; 29/402.01, 402.15, 402.19

[56] References Cited

U.S. PATENT DOCUMENTS

| | | | |
|---|---|---|---|
| 3,356,589 | 12/1967 | Grell et al. | 376/287 |
| 3,469,865 | 9/1969 | Ellenburg | 285/330 |
| 3,823,066 | 7/1974 | Thome | 376/400 |
| 4,410,487 | 10/1983 | Tautz et al. | 376/399 |
| 5,392,322 | 2/1995 | Whitling et al. | 376/260 |
| 5,521,951 | 5/1996 | Charnley et al. | 376/260 |
| 5,623,526 | 4/1997 | Wivagg | 376/288 |

FOREIGN PATENT DOCUMENTS

| | | |
|---|---|---|
| 0059130A1 | 9/1982 | European Pat. Off. . |
| 0459021A1 | 12/1991 | European Pat. Off. . |
| 2818886 | 4/1979 | Germany . |

*Primary Examiner*—Michael J. Carone
*Assistant Examiner*—Matthew J. Lattig
*Attorney, Agent, or Firm*—Herbert L. Lerner; Laurence A. Greenberg

[57] ABSTRACT

Core shrouds are conventionally welded together from cylindrical parts and annular flanges, wherein cracks have recently occurred in the region of weld seams in reactors of the boiling-water type. A core shroud, in particular for cladding a reactor core in a boiling-water nuclear reactor and a method for repairing a core shroud, include recesses disposed transversely relative to the circumferentially extending weld seams. The recesses have a middle part which passes through a region that is thermally influenced during welding as well as transverse grooves or widenings located in front of ends of the middle part and lying outside the thermally influenced region. A clamp which is fitted into the recess is disposed approximately flush with a shroud surface and is wedged in one of the transverse grooves.

10 Claims, 2 Drawing Sheets

CORE SHROUD, IN PARTICULAR FOR CLADDING A REACTOR CORE IN A BOILING-WATER NUCLEAR REACTOR AND A METHOD FOR REPAIRING A CORE SHROUD

CROSS-REFERENCE TO RELATED APPLICATION

This application is a Continuation of International Application Ser. No. PCT/DE95/01186, filed Sep. 1, 1995.

BACKGROUND OF THE INVENTION

Field of the Invention

The invention relates to a core shroud including cylindrical parts and annular flanges connected to one another through the use of weld seams, in particular for cladding a reactor core in a boiling-water nuclear reactor. The invention also relates to a method for repairing a core shroud.

The core shroud in boiling-water nuclear reactors encloses fuel assemblies and serves mainly for carrying circulated cooling water. A stream of the cooling water is directed upward inside the core shroud and downward outside the core shroud. Both the cylindrical parts of the core shroud and the annular flanges are conventionally formed of austenitic metal plates. The annular flanges serve as a support for an upper and a lower core grid and therefore also for fixing the fuel assemblies in the reactor core.

In boiling-water nuclear reactors, cracks may form in the core shroud in the vicinity of weld seams. Although no loads or only insignificant loads occur in the region of those weld seams when the core reactor is operating as intended, the weld seams should nevertheless be additionally secured, in order to prevent such cracks from growing. For that purpose, it has been proposed to mount brackets opposite one another on the outside of the core shroud above and below the respective weld seams and to connect the brackets to one another. However, a considerable disadvantage of that solution is that the cross-section necessary for the flow of the cooling water is appreciably reduced by the brackets.

Particular difficulties also arise because the reactor vessel which was already previously operated must remain filled with water, even during repair work, due to the radioactive radiation, so that all work on the core shroud has to be carried out underwater.

Published European Patent Application 0 459 021 A1, corresponding to U.S. Pat. No. 5,065,490, discloses a method of repair for a screw connection between a metallic core vessel and a likewise metallic thermal shield, in which an existing passage bore is eroded out at right angles. A bolt, that is likewise of rectangular cross-section, is introduced into a passage orifice which is thus obtained and engages behind the core shroud on its inside. The bolt is provided with a passage orifice which has a thread and into which a screw can be screwed. However, that method is suitable only for the connection of metallic components overlapping one another.

SUMMARY OF THE INVENTION

It is accordingly an object of the invention to provide a core shroud, in particular for cladding a reactor core in a boiling-water nuclear reactor and a method for repairing a core shroud, which overcome the hereinafore-mentioned disadvantages of the heretofore-known devices and methods of this general type and in which the repair method can be implemented by remote control and underwater at reasonable outlay and with a high degree of safety.

With the foregoing and other objects in view there is provided, in accordance with the invention, a core shroud, in particular for cladding a reactor core in a boiling-water nuclear reactor, comprising cylindrical parts and annular flanges connected to one another by weld seams; a region thermally influenced during welding; a core shroud surface having at least one groove-like recess formed therein, the at least one recess having a middle part passing through the thermally influenced region, the middle part having ends, and the at least one recess having a widening disposed in front of the ends of the middle part and lying outside the thermally influenced region; and a clamp fitted into the at least one recess, disposed approximately flush with the shroud surface and wedged in the at least one recess.

With the objects of the invention in view, there is also provided a method for repairing a core shroud, in particular for cladding a reactor core in a boiling-water nuclear reactor, which comprises connecting cylindrical parts and annular flanges to one another with weld seams; working a core shroud surface to form at least one groove-like recess having a middle part passing through a region thermally influenced during welding, ends of the middle part, and a widening disposed in front of the ends of the middle part and lying outside the thermally influenced region; and fitting a clamp into the at least one recess approximately flush with the shroud surface and wedged in the at least one recess.

In accordance with another feature of the invention, the recess is an I-shaped recess which runs transversely relative to a circumferentially extending weld seam and parallel to a shroud axis.

In accordance with a further feature of the invention, a force generated by wedging the clamp presses the parts, which are connected to one another through the use of the associated weld seam, onto one another.

In accordance with an added feature of the invention, the groove-like recess is subsequently worked out, in particular eroded, underwater in a plant that is already in operation.

In accordance with an additional feature of the invention, in order to wedge the clamp, two wedges are provided in one of the transverse grooves, each being held by a bent-round retaining tab.

In accordance with yet another feature of the invention, the retaining tabs are left standing on the bottom of the recess during the erosion of the recess.

In accordance with a concomitant feature of the invention, there is provided a multiplicity of configurations, for example twelve, each including a recess and an associated clamp, which are allocated to a weld seam in the circumferential direction.

The structure of the core shroud according to the invention is highly advantageous, because it can be retrofitted without dismantling, virtually in situ, even after a lengthy operating period, in such a way that cracks occurring in or parallel to the weld seams are practically compensated for. This is accomplished because through the use of the clamps provided according to the invention, a crashdown of parts of the core shroud, together with subassemblies held thereby, is as good as ruled out, and because this repair can be carried out by remote control and underwater without serious complications.

Other features which are considered as characteristic for the invention are set forth in the appended claims.

Although the invention is illustrated and described herein as embodied in a core shroud, in particular for cladding a reactor core in a boiling-water nuclear reactor and a method for repairing a core shroud, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
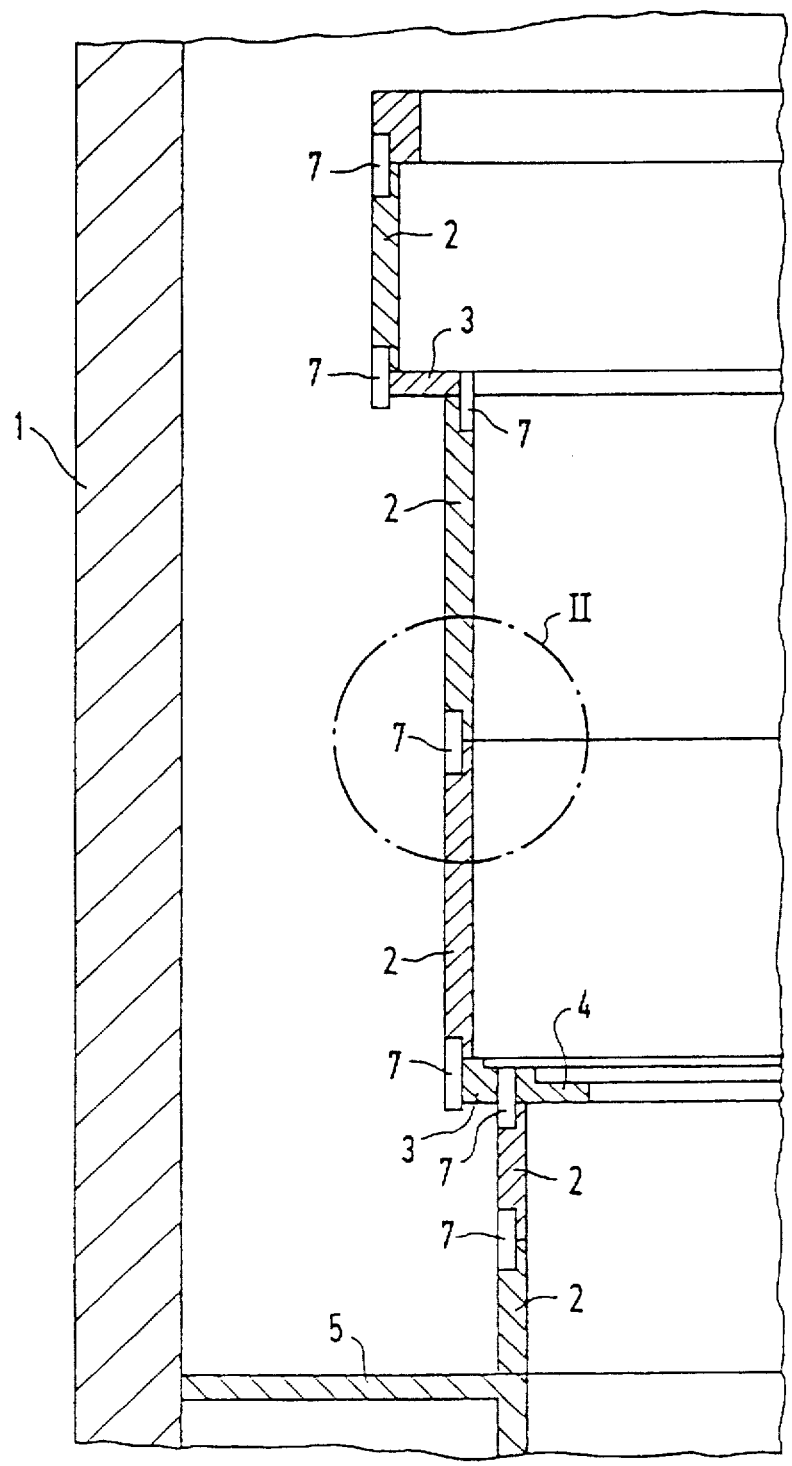
FIG. 1 is a fragmentary, diagrammatic, vertical central-sectional view of a boiling-water reactor.

Referring now to the figures of the drawings in detail and first, particularly, to FIG. 1 thereof, there is seen a core shroud which includes cylindrical parts 2 and annular flanges 3 and is suspended in a manner that is not shown in any further detail in a reactor pressure vessel 1. The parts 2 and the flanges 3 are preferably formed of austenitic material and are welded to one another to form a unit. A core support plate 4 which is fastened to the lower flange 3 carries a non-illustrated lower core grid. The core shroud and the reactor pressure vessel 1 are spaced from one another through the use of a flange 5.

Figure 2:
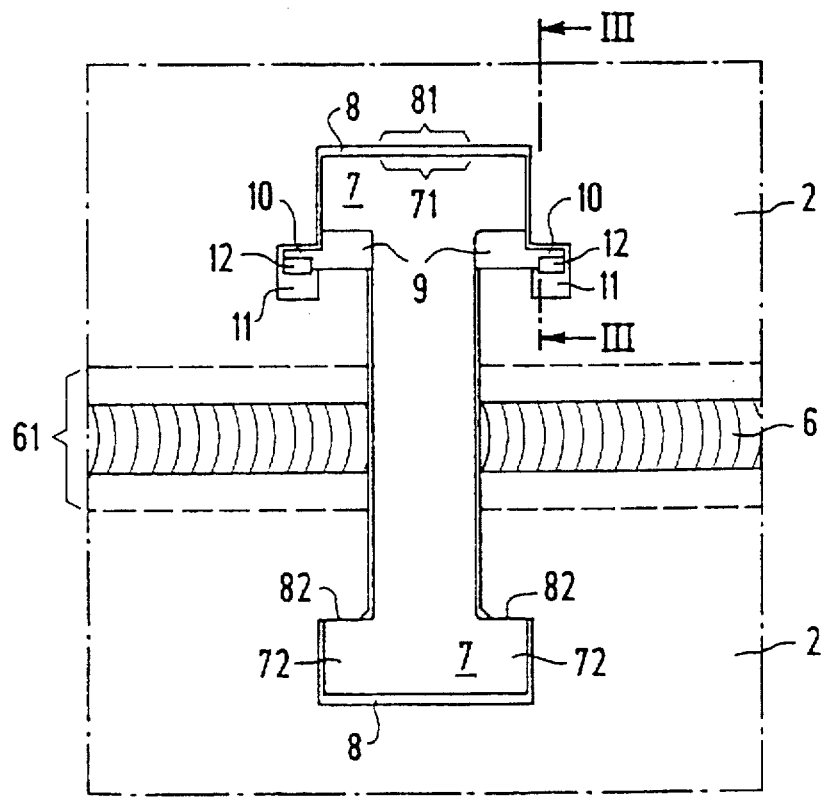
FIG. 2 is an enlarged view of a portion II of FIG. 1 showing a clamp connection according to the invention.
Figure 3:
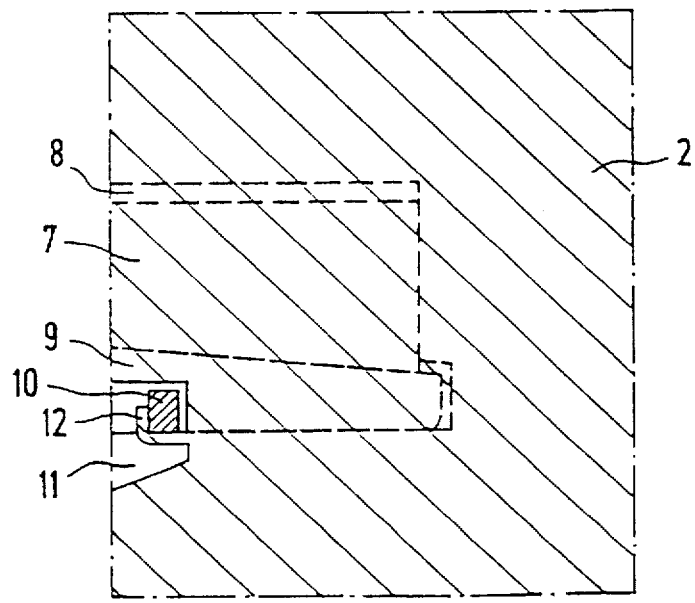
FIG. 3 is an even further enlarged, sectional view taken along a line III—III in FIG. 2, in the direction of the arrows.

Joints between the parts 2 and joints between the parts 2 and the flanges 3 are welded to one another through the use of weld seams 6 shown in FIG. 2. As a result of aging phenomena, particularly due to severe neutron irradiation, cracks may occur in a transitional region 61 from a weld seam 6 to a part 2 or a flange 3. This transitional region 61, which is susceptible to cracking, coincides approximately with a region that is thermally loaded during welding and is indicated, in FIG. 2, as a region between broken lines drawn parallel to the weld seam 6.

Clamps 7 which are wedged in recesses 8 and bridge the weld seam 6, serve as preventive measures to compensate for the effects of any cracks. The recesses 8 are of groove-like configuration and are preferably made underwater by spark erosion with a remote-controllable appliance, on a core shroud which has already been in operation previously for a relatively long period of time. The clamps 7 and the recesses 8 are matched to one another and, in the exemplary embodiment, are of I-shaped configuration.

Each clamp 7 and recess 8 includes a respective middle part 71 and 81 which is longer than the width of the region 61 that is susceptible to cracking. The middle part 81 of the recess 8 has a widening 82 in front of each of its ends. The widening 82 is constructed as an approximately rectangular transverse groove in the exemplary embodiment. The clamp 7 has correspondingly constructed transverse webs 72 which are received by these transverse grooves 82 and which are located completely in a region that is not thermally loaded during welding. The depth of the recesses 8 and the thickness of the clamps 7 are approximately equal to half the wall thickness of the cylindrical parts 2, so that the clamps 7 terminate flush with the outer surface of the core shroud.

In order to provide the play-free connection of the clamps 7 in the recesses 8, the free ends of one of the transverse webs 72 of the clamps 7 are firmly braced against a wall defined by the recesses, through the use of wedges 9 as shown in FIG. 2.

Lateral projections or widenings 10 of the wedges 9 project into lateral pockets or bays 11 of the recesses 8. Tabs 12 are left standing in these bays 11 during the working-out or eroding operation. The lateral widenings 10 are offset relative to rear sides of the wedges 9, so that after the mounting of the clamps 7 and the wedges 9 has been concluded, the tabs 12 can be bent in front of the widening 10 of the wedges. The wedges 9 are then held captive in the recesses 8.

More or less clamps 7 are provided for each weld seam, depending on the number or size of the cracks expected or ascertained. It has proved practical and, for strength reasons usually sufficient if, for example, twelve clamps 7 are distributed along the weld seam 6 about the circumference.

We claim:

1. A core shroud, comprising:

cylindrical parts and annular flanges connected to one another by weld seams;

a region thermally influenced during welding;

a core shroud surface having at least one groove-like recess formed therein, said at least one recess having a middle part passing through said thermally influenced region, said middle part having ends, and said at least one recess having a widening disposed in front of said ends of said middle part and lying outside said thermally influenced region; and a clamp fitted into said at least one recess, disposed approximately flush with said shroud surface and wedged in said at least one recess.

2. The core shroud according to claim 1, wherein said cylindrical part has a circumferential direction and a shroud axis, and said at least one recess has an I-shape extending parallel to said shroud axis and transversely relative to one of said weld seams extending in said circumferential direction of said cylindrical part.

3. The core shroud according to claim 1, wherein said wedged clamp exerts a force pressing said parts mutually connected by said weld seam onto one another.

4. The core shroud according to claim 1, including a wedge and a bent-round retaining tab holding said wedge, for wedging said clamp.

5. The core shroud according to claim 4, wherein said at least one recess defines a bottom on which said retaining tabs are left standing during erosion of said at least one recess.

6. The core shroud according to claim 1, including a multiplicity of configurations allocated to a weld seam in the circumferential direction, each of said configurations including a recess and a clamp associated with said recess.

7. A method for repairing a core shroud, which comprises:

connecting cylindrical parts and annular flanges to one another with weld seams;

working a core shroud surface to form at least one groove-like recess having a middle part passing through a region thermally influenced during welding, ends of the middle part, and a widening disposed in front of the ends of the middle part and lying outside the thermally influenced region; and fitting a clamp into the at least one recess approximately flush with the shroud surface and wedged in the at least one recess.

8. The method according to claim 7, which comprises subsequently eroding the at least one groove-like recess underwater in an operating power plant.

9. The method according to claim 7, which comprises wedging the clamp with a wedge and then bending-round a retaining tab holding the wedge.

10. The method according to claim 9, which comprises leaving the retaining tab standing on a bottom defined by the at least one recess, during the step of working the at least one recess.

* * * * *